US009049325B2

(12) United States Patent
Tatematsu

(10) Patent No.: US 9,049,325 B2
(45) Date of Patent: Jun. 2, 2015

(54) IMAGE FORMING APPARATUS

(75) Inventor: Hirotaka Tatematsu, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 81 days.

(21) Appl. No.: 13/305,119

(22) Filed: Nov. 28, 2011

(65) Prior Publication Data
US 2012/0162704 A1 Jun. 28, 2012

(30) Foreign Application Priority Data

Dec. 27, 2010 (JP) .................................. 2010-289455

(51) Int. Cl.
G06F 3/12 (2006.01)
G09G 3/36 (2006.01)
H04N 1/00 (2006.01)

(52) U.S. Cl.
CPC .... H04N 1/00496 (2013.01); H04N 2201/0091 (2013.01)

(58) Field of Classification Search
USPC ........................................... 345/76, 82, 87, 94
See application file for complete search history.

(56) References Cited

U.S. PATENT DOCUMENTS

| | | | |
|---|---|---|---|
| 7,453,607 B2 | 11/2008 | Hiromatsu | |
| 2004/0108985 A1* | 6/2004 | Song | 345/87 |
| 2007/0115608 A1 | 5/2007 | Tsuji | |
| 2008/0024402 A1* | 1/2008 | Nishikawa et al. | 345/82 |
| 2009/0220268 A1* | 9/2009 | Ito | 399/81 |
| 2010/0277763 A1* | 11/2010 | Aoyama et al. | 358/1.15 |

FOREIGN PATENT DOCUMENTS

| | | |
|---|---|---|
| CN | 1479178 A | 3/2004 |
| CN | 101035404 A | 9/2007 |
| CN | 101309338 A | 11/2008 |
| CN | 100525558 C | 8/2009 |
| CN | 201509240 U | 6/2010 |
| JP | 2-018888 A | 1/1990 |
| JP | 11-084502 A | 3/1999 |
| JP | 2000-252093 A | 9/2000 |
| JP | 2007-027397 A | 2/2007 |
| JP | 2007-125837 A | 5/2007 |
| JP | 2009-204996 A | 9/2009 |

OTHER PUBLICATIONS

JP Office Action dtd Jan. 29, 2013, JP Appln. 2010-289455, English translation.
First Office Action issued in Chinese Application No. 201110446302.8, dispatched on Jan. 3, 2014.
Chinese Office Action dated Jul. 2, 2014 for Chinese Counterpart Application No. 201110446302.8.

* cited by examiner

Primary Examiner — Ashish K Thomas
Assistant Examiner — Frantz Bataille
(74) Attorney, Agent, or Firm — Banner & Witcoff, Ltd.

(57) ABSTRACT

An image forming apparatus is provided. The image forming apparatus includes an image forming unit, a display unit, which is configured to display information, an electric substrate, which is configured to manipulate the display unit to display the information, a cover, which is formed to have an opening in a position corresponding to the display unit, and an insulating sheet, which is arranged to cover the opening and includes a first sheet and a second sheet, the first sheet and the second sheet being arranged to interpose the cover in therebetween. The first sheet is arranged on one of two sides of the cover closer to the display unit. The second sheet is arranged on an opposite side of the cover further from the display unit.

8 Claims, 9 Drawing Sheets

IMAGE FORMING APPARATUS

CROSS REFERENCE TO RELATED APPLICATION

This application claims priority from Japanese Patent Application No. 2010-289455, filed on Dec. 27, 2010, the entire subject matter of which is incorporated herein by reference.

BACKGROUND

1. Technical Field

An aspect of the present invention relates to an image forming apparatus having a display unit for displaying information.

2. Related Art

An image forming apparatus may be operated by a user's instructions entered through operation switches and a display panel provided on an external covering. The operation switches may be exposed through openings formed in the covering. When the user touches the switches and the display panel, static electricity may be generated by the touch and flow into an electric substrate, which is arranged on a backside of the covering. Thus, the electric substrate may be exposed to the static electricity and undesirably damaged. In order to avoid the damage, an insulating sheet to cover a large part of the electric substrate may be interposed in a position between the covering and the electric substrate.

The insulating sheet may be formed to have incised openings, in positions corresponding to the openings in the covering for exposing the switches, and insulating walls to at least partially surround edges of the incised openings. The flow of the static electricity may be blocked by the insulating walls.

SUMMARY

Meanwhile, an opening for exposing a display unit may be formed in the display panel on the covering, in a position to coincide with the display unit. When the user touches an area in the vicinity of the display panel on the covering, the static electricity may be generated and discharged to the display unit through the opening, and the display unit may be undesirably damaged. Therefore, it is desirable to have a configuration to protect the display unit from the static electricity.

However, in the above-mentioned insulating sheet, with the incised openings and the insulating walls, the form and shape of the insulating sheet may become complicated along with the mechanism to protect the display unit, and the complicated form and shape of the insulating sheet may require additional manufacturing processes.

In view of the difficulties, the present invention is advantageous in providing an image forming apparatus, in which the display unit can be protected from the static electricity in a less complicated configuration.

According to an aspect of the present invention, an image forming apparatus is provided. The image forming apparatus includes an image forming unit, which is configured to form an image on a recording medium, a display unit, which is configured to display information, an electric substrate, which is configured to manipulate the display unit to display the information, a cover, which is formed to have an opening in a position corresponding to the display unit, and an insulating sheet, which is arranged to cover the opening and includes a first sheet and a second sheet, the first sheet and the second sheet being arranged to interpose the cover in there-between. The first sheet is arranged on one of two sides of the cover closer to the display unit. The second sheet is arranged on an opposite side of the cover further from the display unit.

According to another aspect of the present invention, a display device for displaying information is provided. The display device includes a display unit, which is configured to display information, an electric substrate, which is configured to manipulate the display unit to display the information, a cover, which is formed to have an opening in a position corresponding to the display unit, and an insulating sheet, which is arranged to cover the opening and includes a first sheet and a second sheet, the first sheet and the second sheet being arranged to interpose the cover in there-between. The first sheet is arranged on one of two sides of the cover closer to the display unit. The second sheet is arranged on an opposite side of the cover further from the display unit.

BRIEF DESCRIPTION OF THE ACCOMPANYING DRAWINGS

DETAILED DESCRIPTION

Figure 1:
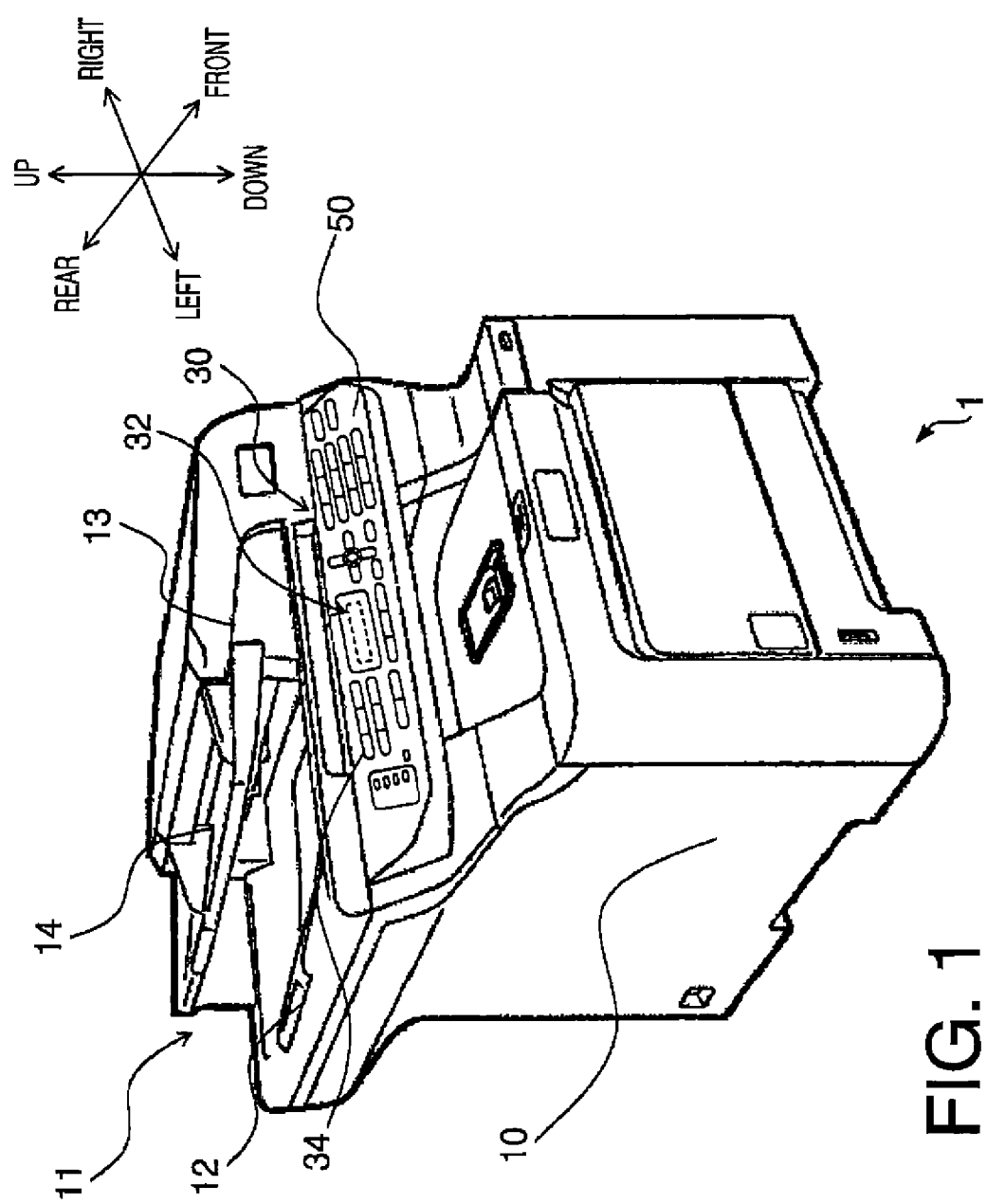
FIG. 1 is a perspective view of an image forming apparatus according to an embodiment of the present invention.

Hereinafter, an embodiment of the present invention will be described with reference to the accompanying drawings. An image forming apparatus 1 is a multifunction peripheral device, which has a plurality of image processing functions, including printing and reading images, and facsimile transmission/receiving. In the present embodiment described below, directions concerning the image forming apparatus 1 will be referred to on basis of a user's position to ordinarily use the image forming apparatus 1 and in accordance with orientation indicated by arrows shown in each drawing. That is, a viewer's nearer right-hand side appearing in FIG. 1 is referred to as a front face of the image forming apparatus 1. A further left-hand side in FIG. 1 opposite from the front is referred to as rear. The front-rear direction of the image forming apparatus 1 may also be referred to as a direction of depth. A side, which corresponds to the viewer's nearer left-hand side is referred to as a left-side face, and an opposite side from the left, which corresponds to the viewer's further right-hand side, is referred to as a right-side face. The right-left direction of the image forming apparatus 1 may also be referred to as a widthwise direction. The up-down direction in FIG. 1 corresponds to a vertical direction of the image forming apparatus.

Overall Configuration of the Image Forming Apparatus

The image forming apparatus 1 includes a printer unit 10 and a reader unit 11. The printer unit 10 has an image forming unit 18 (see FIG. 4), which forms an image on a recording medium such as a sheet of paper. The reader unit 11 is an image reading unit to read an image formed on an original document and is arranged in an upper position with respect to the printer unit 10. The reader unit 11 according to the present embodiment is a flatbed scanner having a platen (not shown). An image appearing on the original document placed on the platen is scanned and read by an image sensor (not shown) such as a CIS (contact image sensor). The read image can be inputted and converted into image data.

In the image forming apparatus 1, a document cover 12 is provided in an upper position with respect to the platen. The document cover 12 is openable and closable with respect to the platen. Further, an auto document feeder (ADF) 13 is provided integrally with the document cover 12. The ADF 13 conveys the original document set in a sheet feeder 14 to a reading position in the reader unit 11, in which the image sensor reads the image on the original document.

Configuration of the Operation Panel

The image forming apparatus 1 is provided with an operation panel 30 (see also FIG. 2), through which a user can enter instructions concerning behaviors of the image forming apparatus 1. The operation panel 30 includes a cover 50, a display panel 32, operation switches 34, a display unit 43 (see FIG. 4), and an electric substrate 36 (see FIG. 8). The operation switches 34 are pressed by the user to input instructions. The display unit 43 is attached on a backside of the cover 50. The electric substrate 36 is connected to the display unit 43 and manipulates the display unit 43 to display information on a display 44 (see FIG. 6) of the display unit 43.

Figure 3:
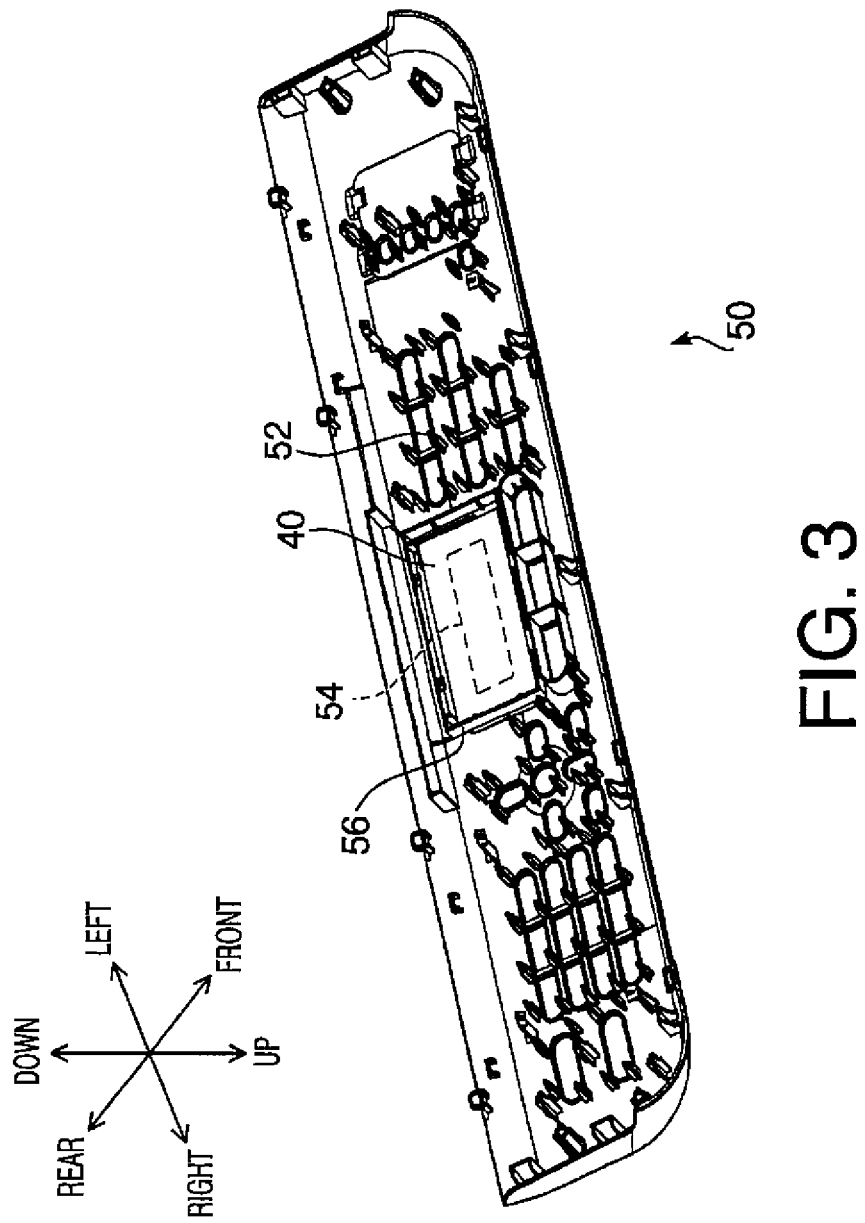
FIG. 3 is a perspective view of a backside of a covering for the operation panel in the image forming apparatus according to the embodiment of the present invention.

As shown in FIG. 3, the cover 50 is formed to have a plurality of through holes 52 and an opening 54.

The display panel 32 is formed to have a rectangle, which is longer in the widthwise direction, in a central area in the cover 50. The display panel 32 includes the opening 54 and an insulating sheet 40. The insulating sheet 40 includes a first sheet 41 and a second sheet 42, which are arranged to interpose the cover 50 in there-between to cover the opening 54 from top and bottom. More specifically, the first sheet 41 and the second sheet 42 are arranged on a lower side and an upper side of the opening 54 respectively. The display panel 32 is arranged in a position to coincide with the display unit 43. The display panel 32 will be described later in detail.

Figure 2:
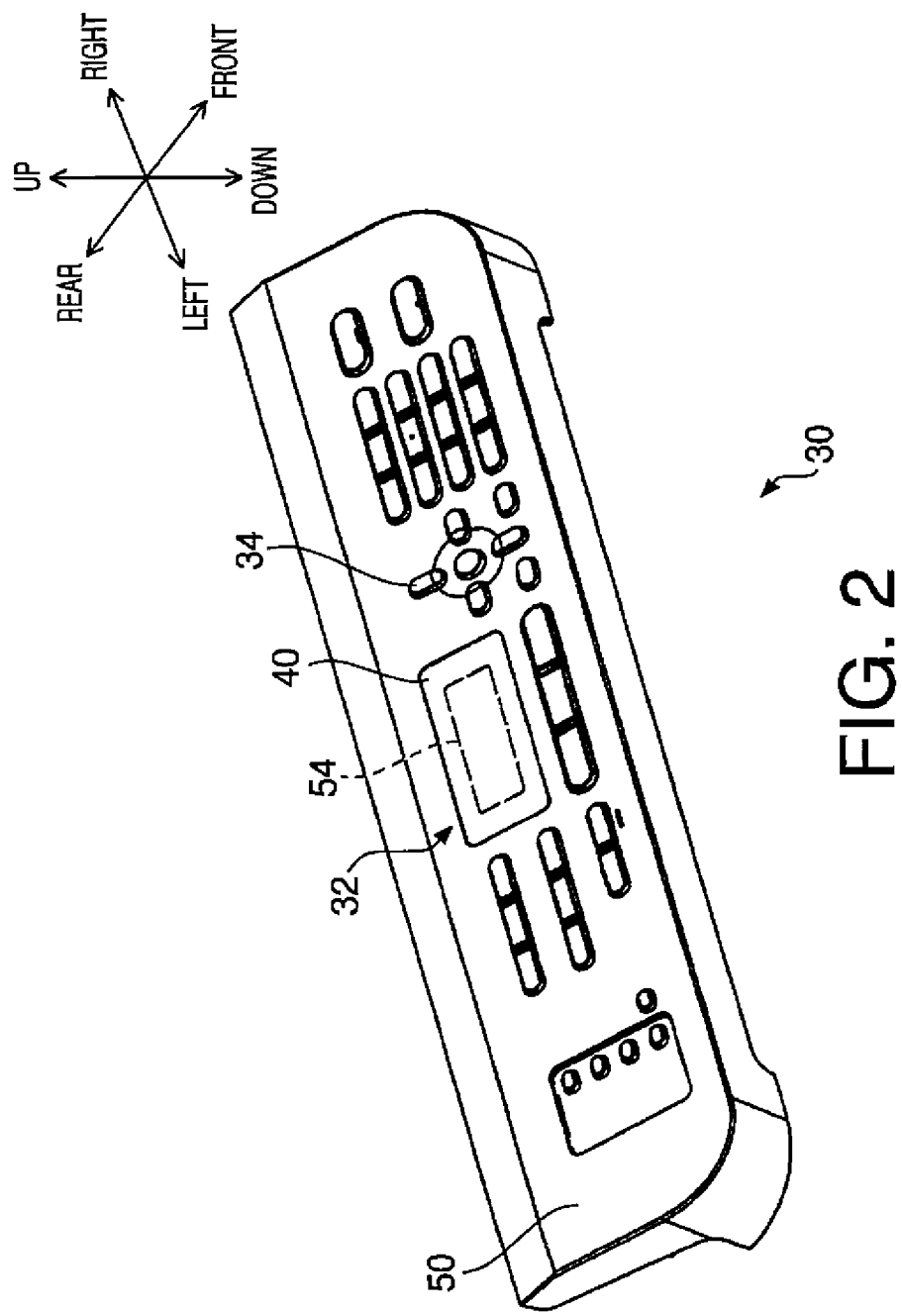
FIG. 2 is a perspective view of an operation panel in the image forming apparatus according to the embodiment of the present invention.

The operation switches 34, solely one of which is indicated by the reference sign in FIG. 2, are protrusions formed in a resin sheet. Conductive members are arranged in positions underneath the protrusions. When the operation switches 34 are pressed, the conductive members underneath the pressed switches 34 contact junctions (not shown) provided on an electric substrate 36, and instructions corresponding to the pressed switches 34 are inputted.

The operation switches 34 are arranged in positions to coincide with the through holes 52, through which the operation switches 34 are exposed outside the cover 50. The resin sheet with the operation switches 34 is interposed in a position between the cover 50 and the electric substrate 36. Thus, areas surrounding the through holes 52 in the cover 50 and the electric substrate 36 are insulated from each other, and static electricity generated by the user touching the operation switches 34 can be restricted from being conducted to the electric substrate 36. Therefore, the electric substrate 36 may be prevented from being damaged by the static electricity.

Electric Configuration of the Image Forming Apparatus

Figure 4:
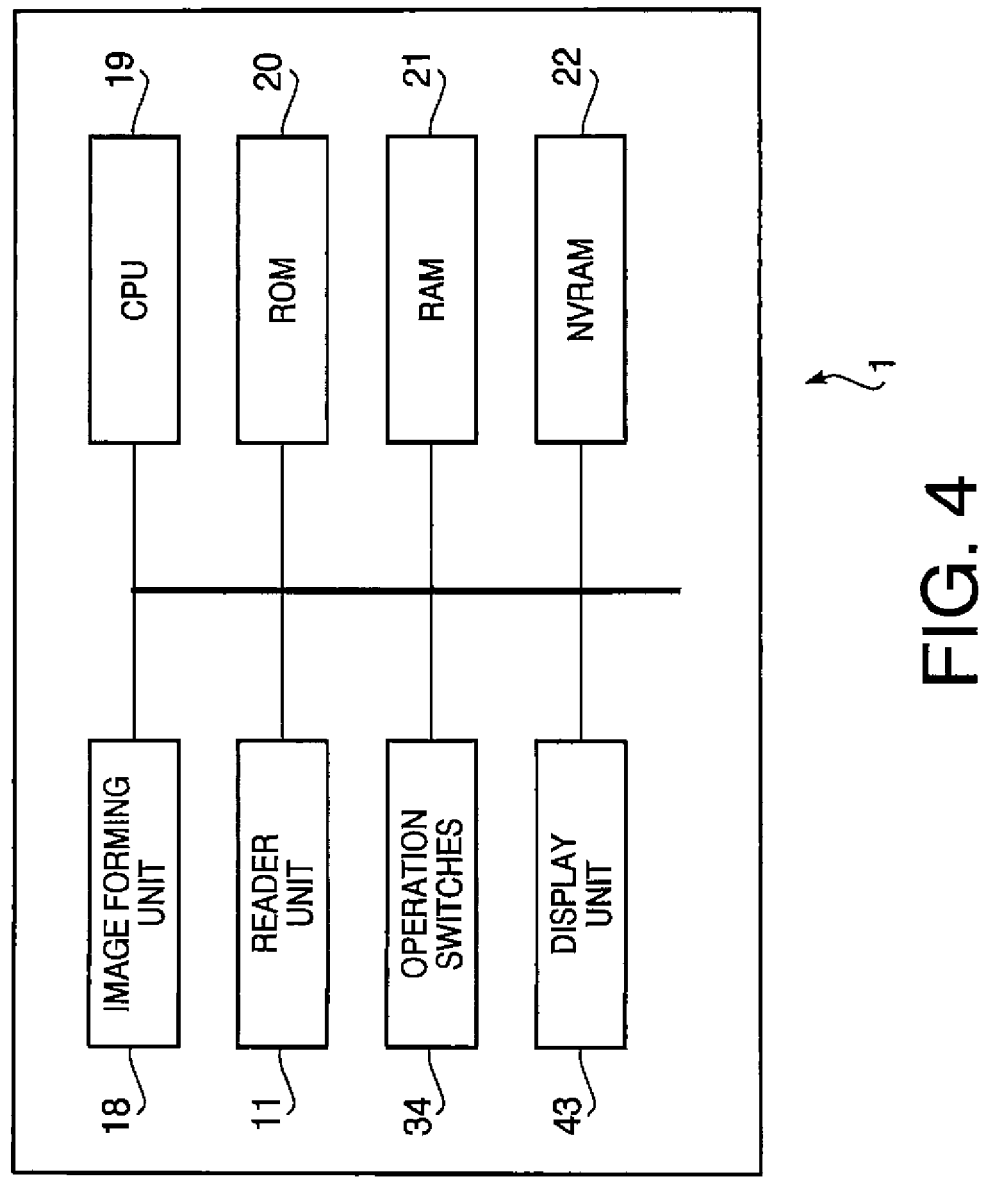
FIG. 4 is a block diagram to illustrate an electrical configuration of the image forming apparatus according to the embodiment of the present invention.

As shown in FIG. 4, the image forming apparatus 1 includes a CPU 19, a ROM 20, a RAM 21, a non-volatile RAM (NVRAM) 22, the reader unit 11, the image forming unit 18, a display unit 43, and the operation switches 34, which are electrically connected with one another.

The ROM 20 is a storage device to store programs, which control behaviors of the image forming apparatus 1. The CPU 19 is a processor, which processes information to be used to achieve functionalities of the image forming apparatus 1 including image forming according to the programs read from the ROM 20. The processed information is stored in the RAM 21 and/or the NVRAM 22.

The image forming unit 18 forms an image on a recording medium according to image data in, for example, a laser-printing method or an inkjet-printing method and includes a conveyer (not shown), which conveys the recording medium from a medium container, such as a sheet cassette, along a feeding path.

Configuration Surrounding the Opening in the Cover

Figure 5:
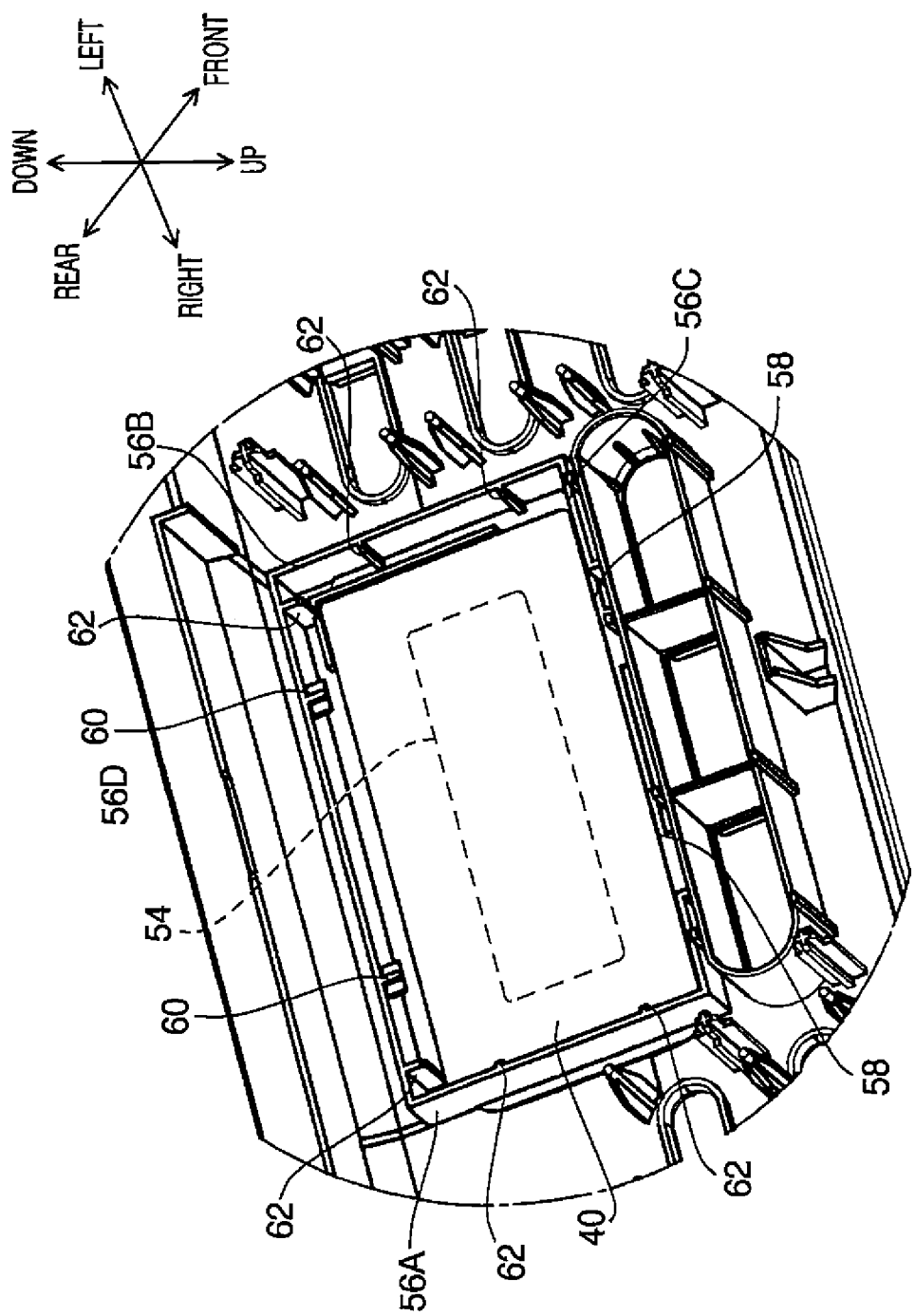
FIG. 5 is an enlarged view of the backside of the covering with an opening in the image forming apparatus according to the embodiment of the present invention.

The cover 50 is formed to have a wall 56 (see FIG. 3) on an outer-side surrounding the opening 54. The wall 56 includes a right-side wall 56A, a left-side wall 56B, a front wall 56C, and a rear wall 56D, which form a rectangular shape in a plane view and protrude downward from a backside of the cover 50 in a side view (see FIG. 5), in a direction to be apart from the backside of the cover 50. In the front wall 56C, positioning cutouts 58, which are open downwardly when the cover 50 is installed in the image forming apparatus 1, are formed. The rear wall 56D is formed to have protrusions 60, which protrude frontward from a lower edge thereof. The positioning cutouts 58 and the protrusions 60 hold a display base 70, on which the display unit 43 is fixed, in a correct position within the cover 50. The display base 70 will be described later in detail. The right-side wall 56A and the left-side wall 56B are formed to have ribs 62, which become in contact with the display base 70 when the display base 70 is held in the correct position.

Figure 6:
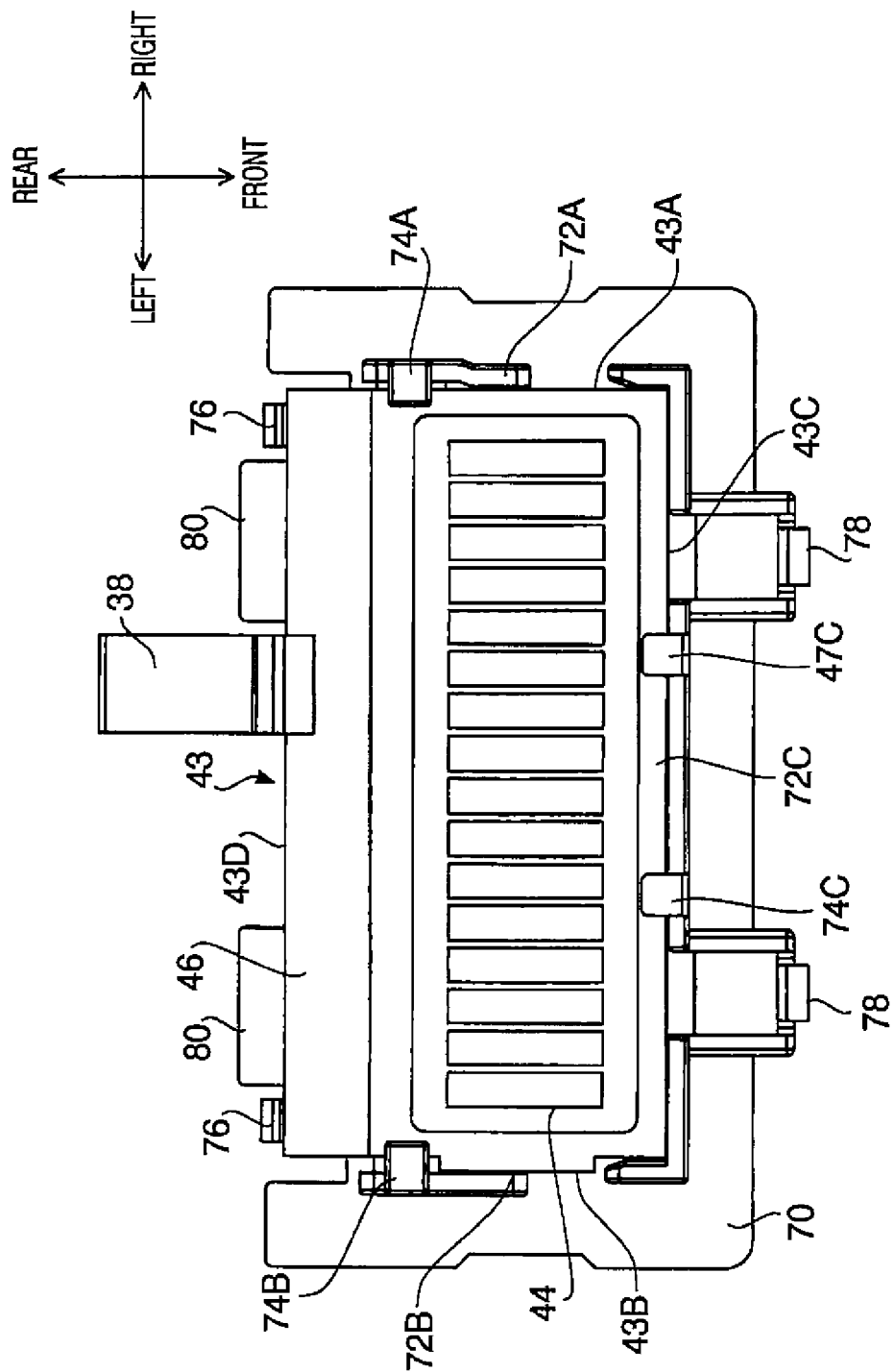
FIG. 6 is a plane view of a display unit attached to a display base of the image forming apparatus according to the embodiment of the present invention.

The display unit 43 is a liquid crystal display (LCD), which includes a display 44 and circuit section 46 (see FIG. 6). In the display unit 43, the display 44 is arranged on top of the circuit section 46. The circuit section 46 and the display 44 are formed to have a same width along the left-right (widthwise) direction, and right and left edges of the circuit section 46 and the display 44 align in same planes along the vertical direction. A depth of the circuit section 46 along the front-rear direction is greater than a depth of the display 44. Front edges of the circuit section 46 and the display 44 align in a same plane along the vertical direction, whilst a rear edge of the circuit section 46 protrudes rearward from a rear edge of the display 44. In a protruded area in the circuit section 46, an electric cable 38 to connect the display unit 43 to the electric substrate 36 is attached. The display unit 43 being connected with the electric substrate 26 is thus enabled to display information and images transmitted through the electric cable 38 from the electric substrate 36.

The display unit 43 is fixed to the display base 70. The display base 70 is formed to have a three-sided wall 72, including a right-side wall 72A, a left-side wall 72B, and a front wall 72C, and is open rearward. The display unit 43 is arranged inside the wall 72 with a right-side edge 43A, a left-side edge 43B, and a front edge 43C thereof being fitted to inner edges of the right-side wall 72A, the left-side wall 72B, and the front wall 72C respectively. Thus, the display unit 43 is set in a correct position with respect to the display base 70.

The right-side wall 72A, the left-side wall 72B, and the front wall 72C are formed to have claws 74A, 74B, 74C respectively, which protrude inwardly from upper edges of the right-side wall 72A, the left-side wall 72B, and the front wall 72C. With the display unit 43 being in contact with the claws 74A, 74B, 74C, the display unit 43 is prevented from slipping upwardly to protrude from the display base 70. In positions along a widthwise direction, to which a rear edge 43D of the display unit 43 aligns when the display unit 43 is fixed in the correct position with respect to the display base 70, claws 76 protruding upwardly from the display base 70 are formed. The claws 73 are arranged in line along the widthwise direction and restrict the display unit 43 from being moved in the direction of depth.

On a front side of the display base 70, engagement pieces 78, which protrude frontward, are provided. The engagement pieces 78 are attached to the display base 70 to extend over the front wall 72C of the display base 70, and the extending sections are deformable rearward.

Figure 7:
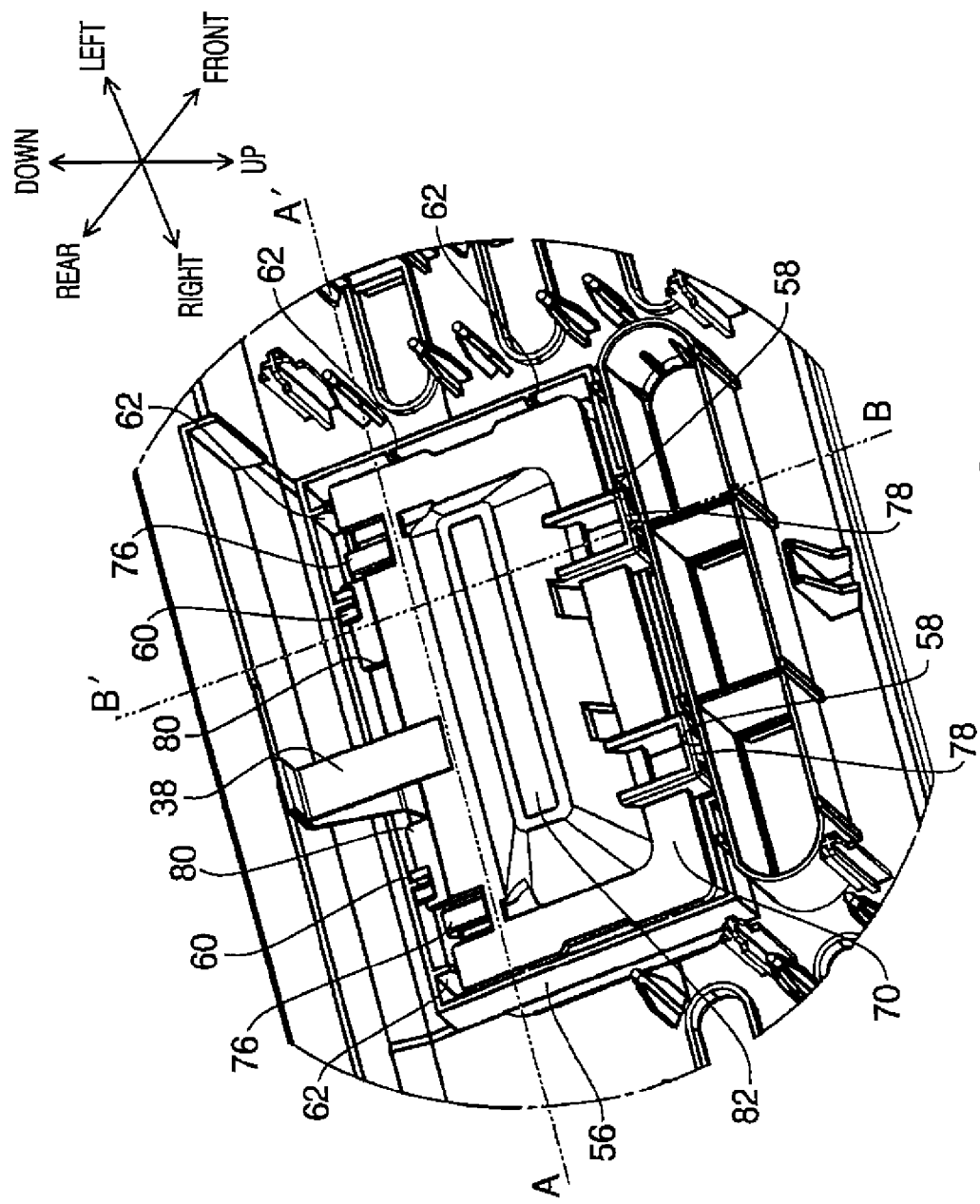
FIG. 7 is a perspective view of the display unit and the display base fixed to the covering of the image forming apparatus according to the embodiment of the present invention.

The display unit 43 fixed to the display base 70 is attachable to the cover 50 (see FIG. 7). The engagement pieces 78 are arranged in positions to coincide with the positioning cutouts 58 in the cover 50 when the display base 70 is attached to the cover 50. Thereby, the engagement pieces 78 are engaged with the positioning cutouts 58, and the display base 70 is fixed to the cover 50.

On a rear side of the display base 70, juts 80, which protrude rearward from a rear edge of the display base 70, are provided. The juts 80 are arranged in inner sides of the claws 76 in line along the widthwise direction in positions to coincide with the protrusions 60, which are formed on the lower edge of the rear wall 56D. When the display base 70 is attached to the cover 50, the juts 80 are in positions to ride over the protrusions 60 and restrict the display base 70 from falling off from the cover 50. Thereby, the display unit 43 is situated in a position corresponding to the opening 54 to face the opening 54.

Figure 9:
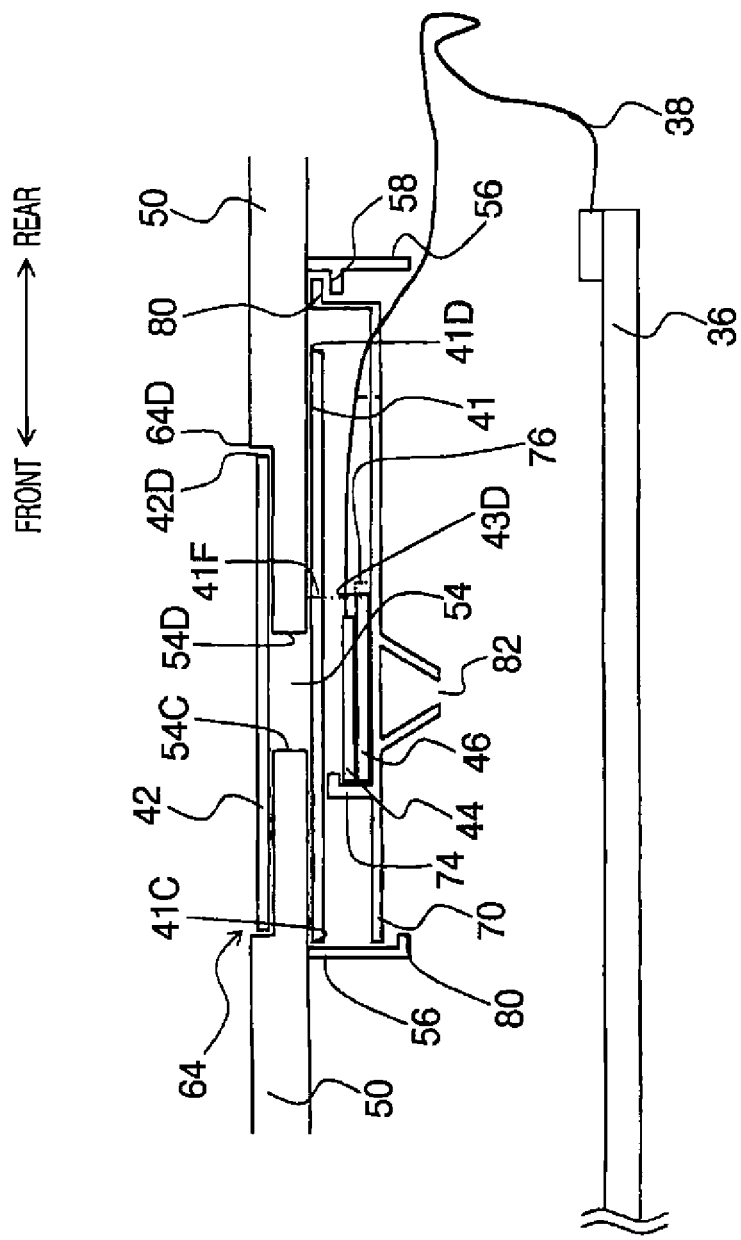
FIG. 9 is a cross-sectional view of the area surrounding the opening for the display unit taken from a line B-B' shown in FIG. 7.

The display base 70 is formed to have an irradiation opening 82, in a position below the display unit 43, when the display unit 43 is held in the display base 70, on a plane in parallel with a lower plane of the display unit 43 (see also FIG. 9). Through the irradiation opening 82, light emitted from an LED lamp (not shown), which is arranged on the electric substrate 36, is directed to the display unit 43. With the light emitted from the LED lamp, information such as characters and images appearing on the display unit 43 can be more clearly displayed to be easily recognized by the user.

Configuration of the Insulating Sheet

Figure 8:
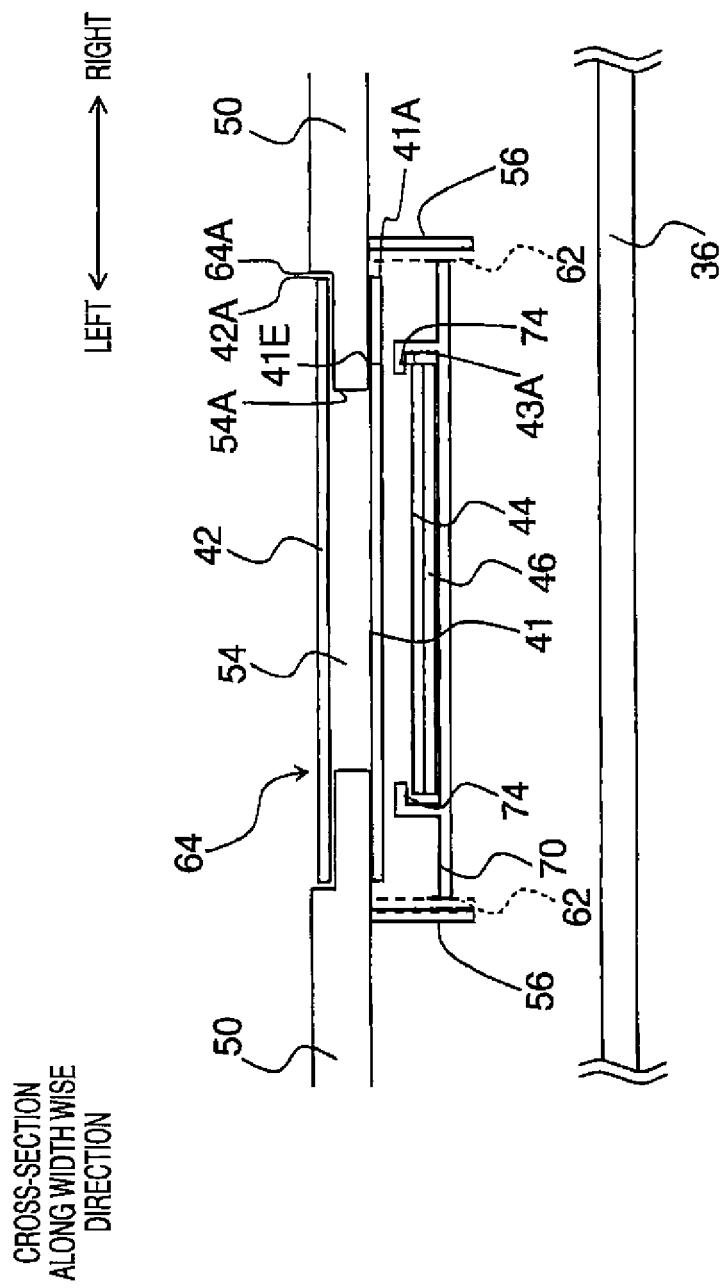
FIG. 8 is a cross-sectional view of an area surrounding an opening for the display unit taken from a line A-A' shown in FIG. 7.

Next, positional relation of the components surrounding the opening 54 with one another along the widthwise direction will be described. FIG. 8 shows a cross-sectional view of the opening 54 in the cover 50 with the display unit 43, taken from a line A-A' shown in FIG. 7, with the electric substrate 36 placed below the display unit 43. On the cover 50, the insulating sheet 40 is arranged to cover the opening 54. More specifically, the insulating sheet 40 includes a first sheet 41, which is adhered in sealing contact to a surface area surrounding the opening 54 on a side closer to the display unit 43 (i.e., a lower side), and a second sheet 42, which is adhered in sealing contact to a surface area surrounding the opening 54 on the side opposite from the display unit 43 across the opening 54 (i.e., an upper side).

The second sheet 42 is arranged in a dent 64, which forms a lower section than an upper plane of the cover 50, surrounding the opening 54. When the second sheet 42 is arranged in the dent 64, therefore, a right-side edge 42A of the second sheet 42 is closer to a right-side edge 54A of the opening 54 than a right-side edge 64A of the dent 64. Meanwhile, a thickness (height) of the second sheet 42 along the vertical direction is smaller than a height of the dent 64, and the second sheet 42 is prevented from protruding to be higher than the upper plane of the cover 50. Therefore, the right-side edge 42A of the second sheet 42 can be prevented from being exposed to the user's touch, and the second sheet 42 can be prevented from being detached from the cover 50.

The first sheet 41 is arranged in a position to face the second sheet 42 across the cover 50 and the opening 54, and is in an upper position with respect to the display unit 43. When the first sheet 41 is arranged in the position, a right-side edge 41A of the first sheet 41 is closer to the right-side edge 54A of the opening 54 than the right-side edge 64A of the dent 64 and the right-side wall 56A. Further, the right-side edge 41A is in a position further from the right-side edge 54A of the opening 54 than a closest point 41E, which is a point directly above and closest to a right-side edge 43A of the display unit 43. A length on the first sheet 41 between the closest point 41E and the right-side edge 41A is greater than a length between the right-side edge 54A of the opening 54A and the closest point 41E. Therefore, even when static electricity is generated and flows through a clearance between the edge 64A of the dent 64 and the edge 42A of the second sheet 42, a creeping distance between the edge 64A of the dent 64 and the edge 43A of the display unit 43 is reserved, and the static electricity is prevented from being conducted along the right side edge 41A of the first sheet 41 to the right-side edge 43A of the display unit 43.

The creeping distance refers to a length, which is required for insulating two conductive members. Specifically, in the present embodiment, the creeping distance refers to a length from the edge of the dent 64, along a lower surface of the second sheet 42, via the opening 54, further along an upper surface of the first sheet 41, and via the edge of the first sheet 41, to the edge of the display unit 43. (Meanwhile, a creeping distance to the electric cable 38 refers to a distance between the edge of the dent 64 and the electric cable 38 via the edge of the first sheet 41.) Whilst the display 44 is made of insulating glass, the static electricity conducted to the surface of the display 44 may not necessarily affect the circuit section 46 severely. Therefore, the creeping distance between the edge 64A of the dent 64 and the display unit 43 ends at the edge 43A of the display unit 43, at which the electric cable 38 is connected to the display unit 43. When a longer creeping distance is reserved, it becomes more difficult for the static electricity to travel from the edge of the dent 64 to the display unit 43 through clearances between the cover 50 and the second sheet 42 and between the cover 50 and the first sheet 41 to be discharged. Therefore, discharge of the static electricity generated by the user's touch during manipulation of the operation panel 30 can be reduced.

The first sheet 41 and the second sheet 42 are formed to have a substantially same widthwise length, and a distance between the right-side edge 54A of the opening 54 and the right-side edge 41A of the first sheet 41 is equivalent to a distance between the right-side edge 54A of the opening 54 and the right-side edge 42A of the second sheet 42. Further, a distance between the right-side edge 54A of the opening 54 and the right-side edge 64A of the dent 64 is equivalent to a distance between the right-side edge 54A of the opening 54 and the right-side wall 56A of the wall 56. Meanwhile, a vertical distance between the lower surface of the first sheet 41, which faces the display unit 43, and the upper surface of the second sheet 42, which is on the opposite side from the display unit 43 across the opening 54, is smaller than a distance between the right-side edge 54A of the opening 54 and the right-side edge 41A of the first sheet 41. In other words, a widthwise section in the creeping distance is longer than a vertical section in the creeping distance; therefore, whilst the vertical length is shortened, the operation panel 30 is maintained to be smaller in a size (height) along the vertical direction.

Next, positional relation of the components surrounding the opening 54 with one another along the direction of depth (the front-rear direction) will be described. FIG. 9 shows a cross-sectional view of the opening 54 in the cover 50 with the display unit 43, taken from a line B-B' shown in FIG. 7, with the electric substrate 36, which is connected to the display unit 43 via the electric cable 38. It is to be noted that a size of the opening 54 and a size of the dent 64 along the direction of depth (see FIG. 9) are smaller than a width of the opening 54 and a width of the dent 64 along the widthwise direction (see FIG. 8).

The second sheet 42 is formed to fit inside the dent 64, and when the second sheet 42 is arranged in the dent 64, a rear edge 42D of the second sheet 42 is closer to a rear edge 54D of the opening 54 than a rear edge 64D of the dent 64.

When the first sheet 41 is arranged in the position to face the second sheet 42 across the cover 50 (and the opening 54) and in the upper position with respect to the display unit 43, a rear edge 41D of the first sheet 41 is further from the rear edge 54D of the opening 54 than a rear edge 43D of the display unit 43 and the rear edge 64D of the dent 64. Further, a front edge 41C of the first sheet 41 is in a position closer to the front wall 56C of the wall 56 than a front edge 54C of the opening 54 and on a rear side of the front wall 56C of the wall 56.

Whilst the rear edge 54D of the opening 54 is closer to the electric cable 38 than the front edge 54D, in order to extend a creeping distance between the rear edge 64D of the dent 64 and the electric cable 38, a distance between the closer rear edge 54D and the rear edge 41D of the first sheet 41 is arranged to be greater than a distance between the further front edge 54C of the opening 54 and the front edge 41C of the first sheet 41. It is to be noted, with a distance between the rear edge 41D of the first sheet 41 and the electric cable 38 being shorter than the distance between the rear edge 41D of the first sheet 41 and the rear edge 43D of the display unit 43, that the creeping distance between the rear edge 64D of the dent 64 and the electric cable 38 may not be long enough to insulate the electric cable 38 from the rear edge 64D of the dent 64. Therefore, the distance between the rear edge 41D of the first sheet 41, which is closer to the electric cable 38, and the rear edge 54D of the opening 54 is reserved to be longer than the distance between the front edge 41C of the first sheet 41, which is further from the electric cable 38 with respect to the rear edge 41D, and the front edge 54C of the opening 54. Thereby, the creeping distance between the rear edge 64D of the dent 64 and the electric cable 38 can be extended to be longer than it would be when the distance between the rear edge 41D of the first sheet 41 and the rear edge 54D of the opening 54 is smaller than or equivalent to the distance between the front edge 41C of the first sheet 41 and the front edge 54C of the opening 54.

Further, a distance between a closest point 41F, which is a point directly above and closest to the rear edge 43D of the display unit 43 on the first sheet 41, and the rear edge 41D of the first sheet 41 is reserved to be longer than a distance between the closest point 41F and the rear edge 54D of the opening 54. Therefore, the creeping distance can be extended, and damage to the display unit 43 due to the static electricity can be prevented.

Effects

According to the above configuration, with the pair of insulating sheets 41, 42, the creeping distance for the static electricity to travel from the opening 54 can be extended to be longer even when the static electricity is generated by the user's touch, and the display unit 43 facing the opening 54 can be protected from the static electricity. Therefore, damage to the display unit 43 due to the static electricity can be prevented.

Further, the distance between the edge of the first sheet 41 and the edge of the opening 54 is arranged to be longer than the vertical distance between the lower surface of the first sheet 41 facing the display unit 43 and the upper surface of the second sheet 42 being the opposite side from the display unit 43 across the opening 54. Specifically, the widthwise amount of the area, in which the first sheet 41 is exposed to the opening 54, and the widthwise amount of the area, in which the second sheet 42 is exposed to the opening 54, are arranged to maintain the substantial creeping distance between the upper surface of the cover 50 and the display unit 43. Therefore, it is not necessary to extend the vertical distance between the first sheet 41 and the second sheet 42 or the height of the opening 54 to be greater in order to reserve the substantial creeping distance, and the image forming apparatus 1 may be downsized in the vertical direction.

According to the above embodiment, the edge 41A of the first sheet 41 is in the position further from the edge 54A of the opening 54 with respect to the closest point 41E, which is in the closest position on the first sheet 41 from the edge 43A of the display unit 43. Therefore, the creeping distance can be extended to be longer than a creeping distance, which may be provided when the distance between the edge 54A of the opening 54 and the edge 41A of the first sheet 41 is smaller than or equivalent to the distance between the edge 54A and the closest point 41E. Accordingly, damage to the display unit 43 due to the static electricity may be avoided.

According to the above embodiment, the distance between the edge 41A of the first sheet 41 and the closest point 41E is longer than the distance between the edge 54A of the opening 54 and the closest point 41E. Therefore, the edge 41A of the first sheet 41 can be arranged in a position further apart from the display unit 43, and the creeping distance can be extended to be longer than a creeping distance, which may be provided when the distance between the edge 54A of the opening 54 and the closest point 41E is longer than distance between the edge 41A of the first sheet 41 and the closest point 41E. Accordingly, the damage to the display unit 43 due to the static electricity may be more effectively avoided.

According to the above embodiment, the distance between the rear edge 41D of the first sheet 41 and the rear edge 54D of the opening 54 is longer than the distance between the front edge 41C of the first sheet 41 and the front edge 54C of the opening 54, whilst the rear edge 41 D is closer to the electric cable 38 and the front edge 41C is further from the electric cable 38. Meanwhile, the electric cable 38 is in the position closer to the rear edge 41D of the first sheet 41 than the display unit 43 along the travel distance of the static electricity. When the electric cable 38 is in the position closer to the rear edge 41D of the first sheet 41 than the display unit 43, the substantial creeping distance may not be reserved. However, with the distance between the rear edge 41D of the first sheet 41 and the rear edge 54D of the opening 54 being longer than the distance between the front edge 41C of the first sheet 41 and the front edge 54C of the opening 54, the substantial creeping distance can be reserved even with the electric cable 38 in the position close to the rear edge 41D of the first sheet 41.

According to the above embodiment, the through holes 52 are formed in the vicinities of the opening 54, and the wall 56 to surround the opening 54 is formed on the lower side of the cover 50, which is closer to the display unit 43 than the upper side. Therefore, static electricity, which may flow through the through holes 52, can also be kept away from the display unit 43 by creeping distances being extended along the wall 56. Further, with the extended creeping distances, the opening 54 can be formed in the position in the vicinity of the through holes 52, and areas in the operation panel 30 can be effectively used. Accordingly, the image forming apparatus 1 may be effectively downsized.

According to the above embodiment, the distance between the edge 54A of the opening 54 and the edge 41A of the first sheet 41 is equivalent to the distance between the edge 54A of the opening 54 and the edge 42A of the second sheet 42. It may be noted that the substantial creeping distance between the edge 64A of the dent 64 and the display unit 43 may be reserved when one of the distance between the edge 54A of the opening 54 and the edge 41A of the first sheet 41 and the distance between the edge 54A of the opening 54 and the edge 42A of the second sheet 42 is longer and the other is shorter, as long as the total creeping distance is equivalent. In such configuration, the through holes 52 are required to be arranged in positions further apart from the edge 54A of the opening 54 for the lengthened amount of longer sheet, because the through holes 52 cannot be formed on the cover 50 in an area coincident with the insulating sheet 40. In other words, the operation switches 34 cannot be arranged in the area coincident with the insulating sheet 40. Therefore, with the distance between the edge 54A of the opening 54 and the edge 41A of the first sheet 41 being equivalent to the distance between the edge 54A of the opening 54 and the edge 42A of the second sheet 42, the distance between the edge 54A of the opening 54 and the through holes 52 is minimized. Accordingly, the areas in the operation panel 30 can be effectively used, and the image forming apparatus 1 may be effectively downsized.

According to the above embodiment, the second sheet 42 is arranged in the dent 64, which is formed to surround the opening 54. Therefore, the second sheet 42 is prevented from protruding to be higher than the upper plane of the cover 50. Therefore, the edge 42A of the second sheet 42 can be prevented from being exposed to the user's touch, and the second sheet 42 can be prevented from being detached from the cover 50.

According to the above embodiment, the distance between the edge 54A of the opening 54 and the edge 64A of the dent 64 is equivalent to the distance between the edge 54A of the opening 54 and the wall 56. Therefore, the dent 64 and the wall 56 can be formed in the vertically coincident positions, and areas surrounding the dent 64 and the wall 56 can be effectively used. Accordingly, the image forming apparatus 1 may be effectively downsized.

Although an example of carrying out the invention has been described, those skilled in the art will appreciate that there are numerous variations and permutations of the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the present invention can be similarly effectively applied to other image forming apparatuses having a display device such as a copier, a multifunction peripheral device, and a facsimile machine. Further, the present invention can be even applied to other apparatuses, which may not necessarily be equipped with the image-forming unit, such as and information processing apparatus, as long as the apparatus is equipped with a user-touchable display device.

What is claimed is:

1. An image forming apparatus, comprising:
an image forming unit, which is configured to form an image on a recording medium;
a display unit, which is configured to display information;
a cover having a first surface, a second surface opposite the first surface, and an opening portion positioned over the display unit;
a first insulating sheet adhered to the first surface of the cover in an arrangement such that the opening portion is covered by the first insulating sheet, wherein the first insulating sheet is disposed between the first surface of the cover and the display unit;
a second insulating sheet adhered to the second surface of the cover in an arrangement such that the opening portion is covered by the second insulating sheet;
an electric substrate, which is configured to manipulate the display unit to display the information; and
an electric cable, which connects the display unit to the electric substrate, at one end thereof;
wherein the opening has a closer edge, which is closer to the one end of the display unit connected with the electric cable, and an opposite edge, which is farther from the one end of the display unit connected with the electric cable,
wherein the first insulating sheet has a closer edge, which is closer to the electric cable, and an opposite edge, which is farther from the electric cable,
wherein a distance between the closer edge of the opening and the closer edge of the first insulating sheet along a spreading direction of the cover is greater than a distance between the opposite edge of the opening and the opposite edge of the first insulating sheet along the spreading direction of the cover, and
wherein the first insulating sheet and the second insulating sheet are arranged to face each other along a direction of thickness thereof across the opening.

2. The image forming apparatus according to claim 1, wherein a distance between one of edges of the first insulating sheet and the second insulating sheet and an edge of the opening portion of the cover is greater than a distance between one of two surfaces of the first insulating sheet closer to the display unit and one of two surfaces of the second insulating sheet farther from the display unit.

3. The image forming apparatus according to claim 1, wherein a distance between an edge of the opening and an edge of the first insulating sheet is greater than a distance between the edge of the opening and a closest point, which is a point closest to an edge of the display unit on the first insulating sheet.

4. The image forming apparatus according to claim 1, wherein a distance between an edge of the first insulating sheet and a closest point, which is a point closest to an edge of the display unit on the first insulating sheet, is greater than a distance between the edge of the opening and the closest point on the first insulating sheet.

5. The image forming apparatus according to claim 1,
wherein the cover has a hole, in which an operation switch to manipulate the image forming apparatus is arranged, and a wall, which is formed on a plane of the cover closer to the display unit to protrude along a direction to be apart from the plane and closer to the display unit, and
wherein the wall is arranged in an outer-side position of an edge of the first insulating sheet.

6. The image forming apparatus according to claim 1,
wherein a distance between an edge of the opening and an edge of the first insulating sheet is equivalent to a distance between an edge of the opening and an edge of the second insulating sheet.

7. A display device for displaying information, comprising:
a display unit, which is configured to display information;
a cover having a first surface, a second surface opposite the first surface, and an opening portion positioned over the display unit;
a first insulating sheet adhered to the first surface of the cover in an arrangement such that the opening portion is covered by the first insulating sheet, wherein the first insulating sheet is disposed between the first surface of the cover and the display unit;
a second insulating sheet adhered to the second surface of the cover in an arrangement such that the opening portion is covered by the second insulating sheet;
an electric substrate, which is configured to manipulate the display unit to display the information; and
an electric cable, which connects the display unit to the electric substrate, at one end thereof;
wherein the opening has a closer edge, which is closer to the one end of the display unit connected with the electric cable, and an opposite edge, which is farther from the one end of the display unit connected with the electric cable,
wherein the first insulating sheet has a closer edge, which is closer to the electric cable, and an opposite edge, which is farther from the electric cable,
wherein a distance between the closer edge of the opening and the closer edge of the first insulating sheet along a spreading direction of the cover is greater than a distance between the opposite edge of the opening and the opposite edge of the first insulating sheet along the spreading direction of the cover, and
wherein the first insulating sheet and the second insulating sheet are arranged to face each other along a direction of thickness thereof across the opening.

8. An image reading apparatus, comprising:
an image reading unit, which is configured to read an image on a recording medium;
a display unit, which is configured to display information;
a cover having a first surface, a second surface opposite the first surface, and an opening portion positioned over the display unit;
a first insulating sheet adhered to the first surface of the cover in an arrangement such that the opening portion is covered with the first insulating sheet, wherein the first insulating sheet is disposed between the first surface of the cover and the display unit;
a second insulating sheet adhered to the second surface of the cover in an arrangement such that the opening portion is covered by the second insulating sheet;
an electric substrate, which is configured to manipulate the display unit to display the information; and
an electric cable, which connects the display unit to the electric substrate, at one end thereof;
wherein the opening has a closer edge, which is closer to the one end of the display unit connected with the electric cable, and an opposite edge, which is farther from the one end of the display unit connected with the electric cable,
wherein the first insulating sheet has a closer edge, which is closer to the electric cable, and an opposite edge, which is farther from the electric cable,
wherein a distance between the closer edge of the opening and the closer edge of the first insulating sheet along a spreading direction of the cover is greater than a distance between the opposite edge of the opening and the opposite edge of the first insulating sheet along the spreading direction of the cover, and
wherein the first insulating sheet and the second insulating sheet are arranged to face each other along a direction of thickness thereof across the opening.

* * * * *